United States Patent [19]

Friedman

[11] Patent Number: 4,975,562

[45] Date of Patent: Dec. 4, 1990

[54] HEATER AND THERMOSTAT UNIT

[75] Inventor: Abraham Friedman, Brooklyn, N.Y.

[73] Assignee: Willinger Brothers, Inc., Oakland, N.J.

[21] Appl. No.: 334,609

[22] Filed: Apr. 6, 1989

[51] Int. Cl.[5] .................. H05B 1/02; H05B 3/78; H01H 37/52

[52] U.S. Cl. .................. 219/523; 116/282; 219/506; 337/361; 338/196

[58] Field of Search .............. 219/523, 331, 328, 506; 116/282; 337/361; 338/196-199

[56] References Cited

U.S. PATENT DOCUMENTS

| | | | |
|---|---|---|---|
| 2,278,629 | 4/1942 | Winning | 337/361 X |
| 2,839,660 | 6/1958 | Davies | 219/523 X |
| 2,888,537 | 5/1959 | Mears | 337/361 X |
| 3,107,290 | 10/1963 | Willinger | 219/523 X |
| 3,229,659 | 1/1966 | Sciascia | 116/282 |
| 3,564,589 | 2/1971 | Arak | 219/523 X |
| 3,678,434 | 7/1972 | Brooks | 338/196 X |
| 4,072,847 | 2/1978 | Craven | 219/523 |
| 4,812,626 | 3/1989 | Strada | |

Primary Examiner—Anthony Bartis
Attorney, Agent, or Firm—Helfgott & Karas

[57] ABSTRACT

A heater for heating water in an aquarium tank is provided with a thermostat which includes a bimetal strip carrying one contact and another strip carrying another contact. Upon deformation of the bimetal strip in response to temperature changes, the contacts are closed to connect the heater with an electrical supply circuit. The distance between the contacts is initially set by a rotatable cam acting on a curved portion of the bimetal strip. A cylindrical body which supports the cam to rotate the latter is provided with a helical groove in which is engaged an indicator captured in an elongated axial slot formed in a support of the cylindrical body. The support has at least one scale on its surface visible through a glass container of the heater. When the cam is rotated to change the distance between the contacts this change is indicated by the position of the indicator on the scale.

18 Claims, 2 Drawing Sheets

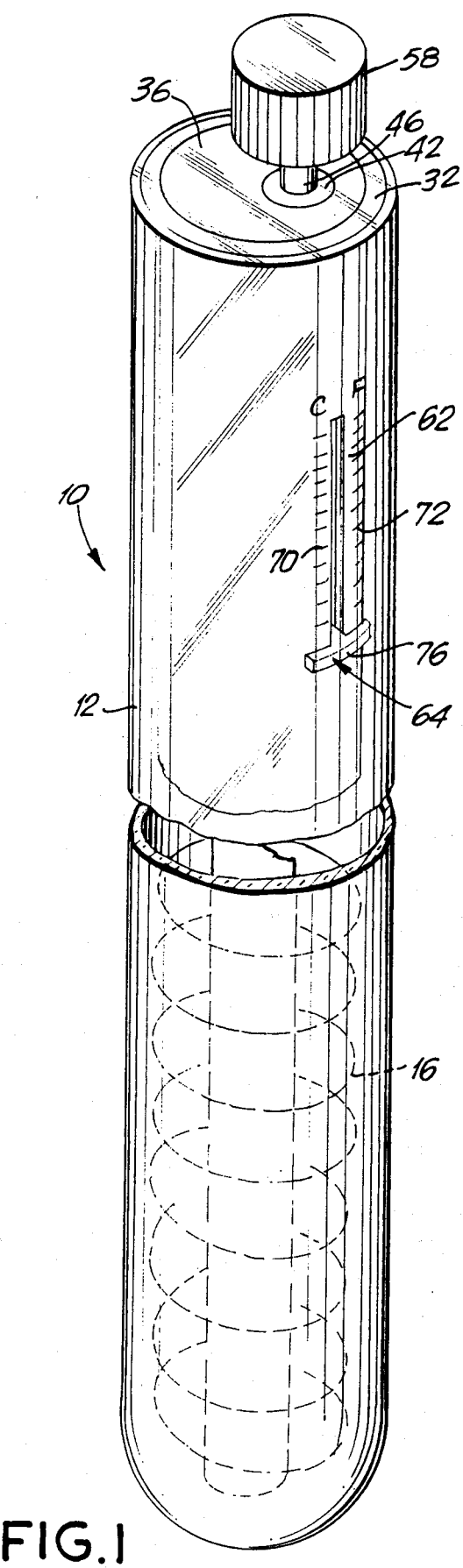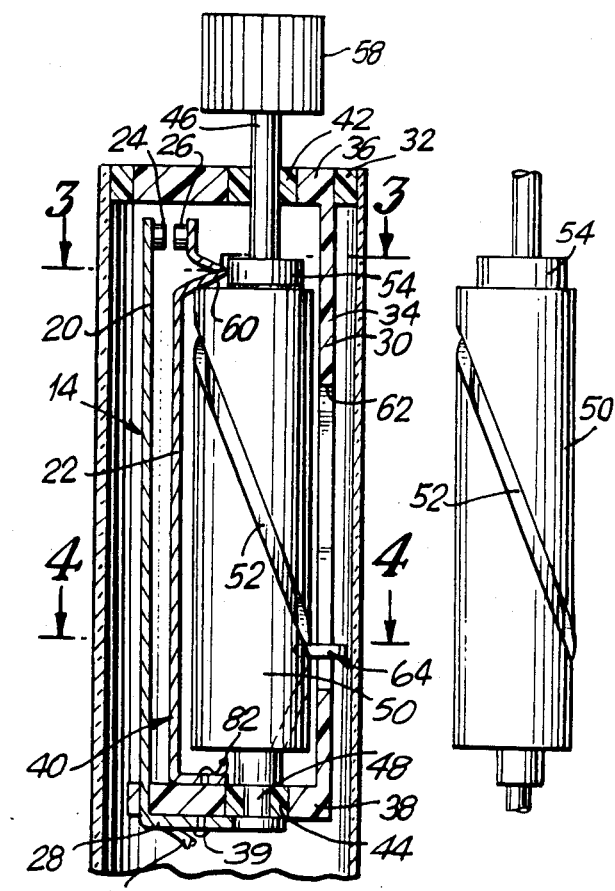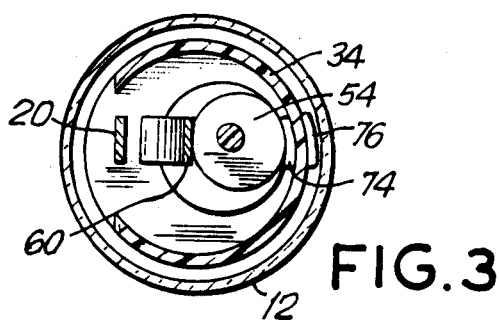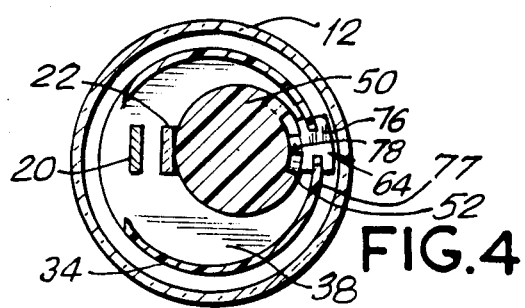
FIG.1  FIG.2  FIG.5  FIG.3  FIG.4

HEATER AND THERMOSTAT UNIT

BACKGROUND OF THE INVENTION

The present invention relates to a heater of the immersion type intended for use in an aquarium tank, and provided with a thermostat for setting and maintaining a desired temperature within the aquarium tank.

Heaters of the foregoing type equipped with thermostats are known. Typically, a thermostat or a thermoregulating device is provided on the heater to maintain the aquarium water within the temperature range compatible with the living conditions required for the fish.

Heaters may be of various types, including a heating element, e.g. heating coil enclosed in a glass container for immersion in the aquarium water. A thermostat which can be provided on the same container can be adjusted to various operating temperatures.

A thermostat or thermoregulator disclosed in EPC Publication No. 228,521 is formed by a bimetal strip which includes two contacts one of which is fixed and another is movable. When the temperature lowers the bimetal deforms and the contacts of the bimetal strip are closed. Current is then supplied to the heating element through the bimetal strip. This thermostat includes an externally rotated cylindrical element which is provided with a spiral line on its lateral surface. The line divides the cylindrical surface of the element into two differently colored portions which are visible through a longitudinal slot formed in a screen covering the cylindrical element and carrying a scale. The cylindrical element is axially coupled to a screw which bears down on one of the bimetal strips to bend it with respect to the other bimetal strip. Rotating of the cylindrical element by means of an external knob adjusts the relative spacing between the contacts. At the same time it positions the separation boundary between the two colored portions to a point on the scale corresponding to the desired temperature. The bimetal strips are calibrated at this temperature. The problem with this prior art thermoregulating device is that the line dividing two different colored portions may hardly be visible through the narrow slot and this makes the device difficult to adjust to a working temperature each time when desired. Another disadvantage of the known thermostat resides in that it comprises a large number of elements and is quite expensive to make.

Accordingly, there is need for a heater and thermostat unit of the immersible type which is easy to operate and less expensive to manufacture.

SUMMARY OF THE INVENTION

It is an object of the present invention to provide an improved heater and thermostat unit of the immersion-type.

It is another object of this invention to provide a heater and thermostat unit which is easy to manufacture with reduced costs, as compared to conventional devices of the type under consideration.

Briefly, in accordance with the present invention, there is provided a housing in which is positioned a heater in combination with a thermostat. The thermostat comprises a bimetal strip with one contact at its end and a further strip with another contact facing the contact of the bimetal strip. The distance between the contacts corresponding to the rest position of the bimetal strip is calibrated or adjusted by a cam held on a cylindrical body, rotated by an externally positioned knob and provided with an elongated spiral groove. The rotation of the cam is followed by a bent portion of one of the strips to move one of the contacts to or away from the other contact. The thermostat includes a support member positioned in the housing and formed at a side wall thereof with an elongated axial slot which receives an indicator for captured slidable movement therein. A scale can be mounted on the support member. The indicator has a projection engaged in the spiral groove of the cylindrical body. When the cylindrical body with the cam rigidly connected thereto are rotated by the knob, the spiral groove urges the indicator to move axially along the elongated slot and indicate on the scale the value corresponding to a desired temperature.

In an embodiment, the two strips extend parallel to each other.

In an embodiment, the support member includes a peripheral wall of a C-shaped cross-section, and two opposing disk-shaped end walls seated within the peripheral wall of the housing at the upper and lower parts of the thermostat. The heater can be positioned in the housing below the lower end wall of the thermostat.

In an embodiment, the housing has secured thereto two rails or guides spaced from each other to receive therebetween a plate-like slide which carries thereon two scales. The slide with the scales can initially be moved in the rails relative to the indicator which is captured in the elongated axial slot of the side wall of the housing. Thereby the scales are adjusted to a reference temperature point and the slide can then be secured, for example, by adhesive to the side wall of the housing.

The aforementioned objects, features and advantages of the invention will, in part, be pointed out with particularity, and will, in part, become obvious from the following more detailed description of the invention, taken in conjunction with the accompanying drawing, which form an integral part thereof.

BRIEF DESCRIPTION OF THE DRAWINGS

FIG. 1 is an elevational perspective view of the heater-and-thermostat unit according to the invention;

FIG. 2 is a sectional elevation view of the thermostat according to the invention;

FIG. 3 is a cross-sectional view taken along line 3—3 of FIG. 2;

FIG. 4 is a cross-sectional view taken along line 4—4 of FIG. 2; and

FIG. 5 is an elevational view of a detail of the thermostat of FIG. 2;

DETAILED DESCRIPTION OF THE PREFERRED EMBODIMENTS

Figure 6:
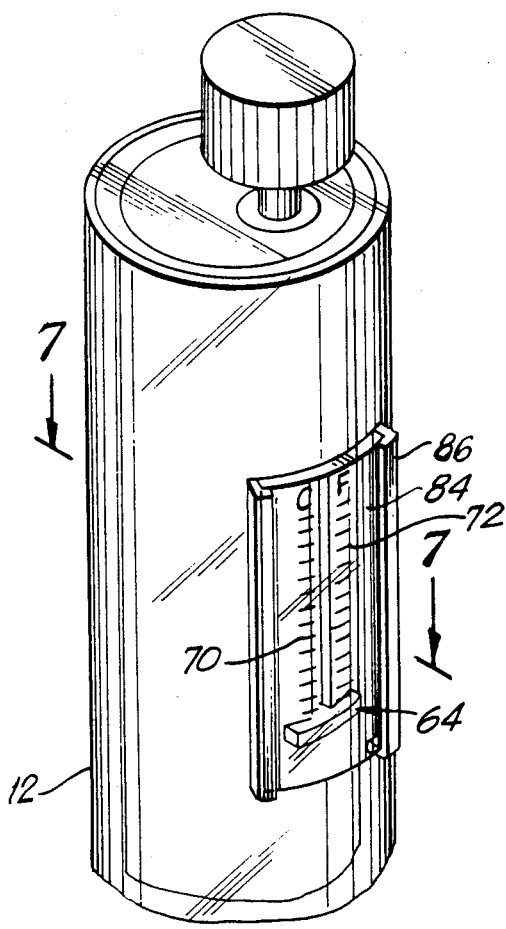
FIG. 6 is an elevational perspective view of the heater-and-thermostat unit, with a lower part taken away, provided with a device for adjusting the scales of the thermostat to a fiducial point.

Referring now to the drawings in detail, FIG. 1 shows a heater unit generally designated at 10 and comprising a substantially cylindrical elongated housing or container 12 of a clear transparent, translucent or the like plastic or glass, in the upper part of which is accommodated a thermostat 14, shown in detail in FIGS. 2-5.

The lower part of housing 12 accommodates a heater which is of a conventional construction and can be of various well known types. By way of example it is shown to include a heating coil 16 extending along about half the length of the housing 12 and consisting, for example, of a Ni-Cr spiral coil. Current is supplied to the heating coil 16 from the outside through a bimetal contact of the thermostat 14.

Referring now to FIGS. 2 to 5 it will be seen that the thermostat 14 comprises two substantially parallel metal strips 20 and 22 each carrying a respective contact 24, 26 at the inside thereof and facing each other. Metal strip 20 is L-shaped and is fixed at its lower leg 28 to a support insert 30 made of non-conductive plastic and supporting thermostat 14 in the housing 12. The insert 30 is secured in the housing 12 by means of a ring washer 32 fit in and secured at the internal wall of housing 12 at an upper end thereof. Metal strip 22 is flexible and also has a substantially horizontal lower leg at which strip 22 is also connected to insert 30. Insert 30 is defined by a peripheral wall 34 which is substantially C-shaped in cross-section and is closed at opposing ends by disk-shaped end walls 36 and 38. The lower legs of the strips 22 and 20 are respectively coupled to the top and bottom of the end wall 38 by means of screws or rivets 39.

A thermo-regulating assembly generally designated at 40 is disposed in the interior of insert 30 and is supported between the two opposing horizontally extending end walls 36 and 38 by means of bushings 42, 44, preferably of non-conductive plastic which serve as bearings for upper and lower shafts 46,48 of the thermo-regulating assembly. The assembly 40 further includes a cylindrical body 50 having at its peripheral surface a helical groove 52 running substantially over the entire length of body 50. A cam 54 is secured at the upper end face of the cylindrical body 50, for example by means of an adhesive. The cam 54 is axially offset with respect to the axis of the cylindrical body 50. The cam 54 is coupled to the lower end of shaft 46 which is terminated at its upper distal end with a knob 58. It is to be appreciated that knob 58, cylindrical body 50, cam 54 and shafts 46,48 constitute a rigid assembly which is rotatable in bearings 36 and 38 upon rotation of knob 58.

Strip 20 carries contact 24 which is referred to as a fixed contact while strip 22 carries contact 26 which is referred to as a movable contact. The flexible metal strip 22 is formed with a bent laterally protruding portion 60 which is in engagement with the cam surface of cam 54 and operates as a cam follower. Because of the offset arrangement of cam 54, by rotating knob 58 and cam 54 therealong the spacing between contacts 24 and 26 may be varied due to the displacement of the flexible strip 22 relative to fixed strip 20.

The C-shaped end wall 34 of insert 30 is formed with an elongated slot 62 visible through the transparent wall of housing 12. The wall 34 is shown as carrying thereon two temperature scales 70 and 72, one in Celsius and another in Fahrenheit degrees also clearly visible through glass housing 12. In a modified construction, scales 70 and 72 may be marked on the outer surface of the housing 12. An indicator 64 is movably supported in the elongated slot 62. The indicator 64 includes a wider portion, which is H-shaped in cross-section and has two spaced-apart parallel legs 74,76 respectfully engaging two opposite sides of the peripheral wall 34 of insert 30 with the interconnecting web portion 77 fitting into the slot 62. A narrow tail portion or projection 78 protrudes into the helical groove 52 of cylindrical body 50 and is slidable therein upon rotation of cylindrical body 50 by means of knob 58. Although the projection 78 sits in the groove 52, the rest of the indicator is captured by the insert 30 and its movement is restricted to an axial movement along slot 62. In this manner any change in the rotational position of cylindrical body 50 and thus the position of cam 54 effecting the distance between the two contacts 24 and 26 will be immediately indicated by an axial movement of the indicator 64 along the slot 62.

Either strip 20 or strip 22 is a bimetal strip which, depending on its deformation opens and closes contacts 24 and 26 and thus the supply circuit transmitting current through wires 80, 82 to the heating element 16. Strip 20 is a bimetal strip in the exemplified embodiment of FIGS. 1–5 whereas in the embodiment of FIGS. 6 and 7, the adjustable strip 22A is the bimetal strip and cooperates with fixed strip 20A. The thermostat 14 with the thermo-regulating assembly 40 thereof is designed to vary the rest position of the other strip 22 to control the distance between contacts 24 and 26 corresponding to the working temperature desired.

In order to calibrate the distance between contacts 24 and 26 the knob 58 and thus cam 54 is rotated and the indicator 64 positioned so that it is visible through the transparent housing or container 12 for the spacing provided between the contacts. Knob 58 can be provided with a stop for limiting the rotation thereof.

For initial calibration, the cam 54 can be made separate from the cylinder body and rotated to a desired position, such as a dwell, for the maximum spacing of the contacts. The cam 54 is then secured to the top of the cylinder body.

Figure 7:
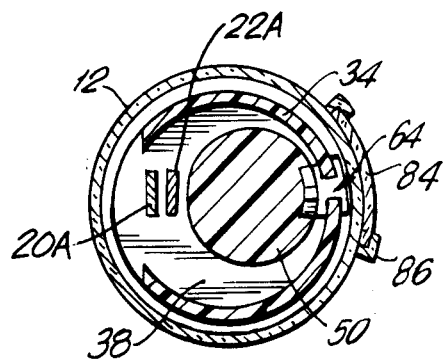
FIG. 7 is a cross-sectional view taken along line 7—7 of FIG. 6.

In the embodiment illustrated in FIGS. 6 and 7, scales 70 and 72 are provided not on the external side of the C-shaped wall 34 visible through the transparent container 12 but on the outer peripheral wall of the container. Scales 70 and 72 are printed on a segment-shaped slide or plate 84 which can slide in two side guides or rails 86 each having L-shaped configuration. In this embodiment scales 72 are initially movable relative to the pointer or indicator 64 so as to adjust the calibrated scales 70 and 72 to a fiducial i.e. reference point, before the thermostat is used. After the reference or initial position of scales 72 has been adjusted by moving slide 84 in rails 86 attached to the housing or container 12 slide 84 carrying thereon scales 70 and 72 is secured, for example, by suitable adhesive, to the outer wall of container 12 and the thermostat-and-heater unit is ready to use.

As is apparent from the above disclosure the immersion type thermostat according to the present invention offers substantial advantages as compared to conventional devices of the foregoing type. The unit or assembly 40 is easy to make and all its elements can be, for example, glued or molded to each other. The provision of the indicator is such that its position is clearly visible relative to the scales. This is particularly important when the heater-and-thermostat unit is immersed in the water of a fish aquarium tank. It makes it possible to quickly react to any fluctuations in environmental conditions and change the temperature within the aquarium to the desired temperature.

While the practice of our invention has been described and illustrated using specific procedures and specific apparatus, such description and illustration is meant to be exemplary only and not restrictive, since obviously many changes and modifications can be made without departing from the spirit and scope of the invention.

What is claimed is:

1. A heater in combination with a thermostat for use in an aquarium tank, comprising:

housing means;

heating means accommodated in said housing means; and thermo-regulating means also accommodated in said housing means and electrically connected to said heating means to transmit electric current thereto from a supply circuit, said thermo-regulating means including a bimetal strip carrying a first contact thereon, means carrying a second contact, said bimetal strip deforming in response to temperature changes to thereby open and close the contacts to control the electric current to said heating means, and means for varying an initial position of at least one of said contacts relative to the other of said contacts so as to adjust the initial relative position of said contacts corresponding to a desired working temperature in the aquarium tank, said varying means including an elongated cylindrical body journalled for rotation about its axis of elongation in said housing means, means for selectively rotating said cylindrical body, displacement means operatively interconnected between said cylindrical body and one of said bimetal strip and said carrying means so as to move one of said first and second contacts towards or away from the other of said first and second contacts upon rotation of said cylindrical body by said rotating means, said cylindrical body having a longitudinally extending spiral groove on a peripheral surface thereof, indicator means for indicating a relative position of said contacts, said indicator means including an indicator member movably engaged in said spiral groove, and means for restricting said indicator member to a linear movement along the longitudinal axis of said cylindrical body so that, upon rotation of said cylindrical body, to define a relative position of said contacts, said indicator member being urged by said spiral groove to move linearly along said axis, whereby a position of said indicator member along said cylindrical body will correspond to the relative position of said contacts, said housing means being constructed so that the position of said indicator member along said cylindrical body is visible through said housing means.

2. A combination according to claim 1, wherein said displacement means includes a cam connected to said cylindrical body and rotatable therewith by said rotating means, said cam being axially offset with respect to the axis of rotation of said cylindrical body, and a cam follower means engaging said cam and connected with one of said bimetal strip and said carrying means.

3. A combination according to claim 2, wherein said bimetal strip includes an outwardly laterally bent portion which forms said cam follower means.

4. A combination according to claim 2, wherein said means carrying a second contact includes a fixed strip supporting said second contact at a free end thereof and extending parallel to said bimetal strip.

5. A combination according to claim 4, wherein said bimetal strip includes an outwardly laterally bent portion which forms said cam follower means, and supports at a free end thereof said first contact which faces said second contact.

6. A combination according to claim 2, wherein said rotating means includes a knob connected to said cylindrical body, said cylindrical body having a shaft extending outwardly from said housing means and supporting at an external end thereof said knob of said rotating means for rotating said cylindrical body and said cam.

7. A combination according to claim 2, further including support means for supporting said cylindrical body, said cam, said bimetal strip and said means carrying a second contact in said housing means.

8. A combination according to claim 7, wherein said cylindrical body has two shafts coincident with the axis of said cylindrical body and extending outwardly therefrom in opposite directions, and said support means includes a support member including a peripheral wall of a substantially C-shaped cross-section and two disk-shaped end walls, and bearings inserted in said disk-shaped end walls and supporting said two shafts of said cylindrical body.

9. A combination according to claim 8, wherein said restricting means includes the longitudinal elongated slot formed in said C-shaped wall and extending along an axis of said support member.

10. A combination according to claim 9, wherein said indicator member includes a projection engaged in said spiral groove so that, upon rotation of said cam resulting in movement of said one of said first and second contacts toward or away from the other of said first and second contacts, said indicator member slides along said elongated slot.

11. A combination according to claim 10, wherein said indicator means further includes two scales provided at two sides of said elongated slot, said scale means being visible on an external side wall of said housing means, said indicator member indicating on said scales a temperature value corresponding to said relative position of said first and second contacts.

12. A combination according to claim 11, and further comprising means for adjusting an initial relative position of said scales and said indicator member to a fiducial point.

13. A combination according to claim 12, wherein said adjusting means include rail means secured to said external side wall of said housing means and slide means carrying thereon said scales and adapted to be initially moved in said rail means to a predetermined position relative to said indicator member and be attached to said side wall in said predetermined position.

14. A combination according to claim 13, wherein said rail means include two side rails each having an L-shaped configuration and spaced from each other for receiving said slide means.

15. A combination according to claim 14, wherein said slide means includes a curved plate-like slide having two opposing end faces received in said rails.

16. A combination according to claim 1, and further including scale means visible from an exterior side of said housing means, said indicator member being adapted to move along said scale means to indicate on said scale means a temperature value corresponding to said relative position of said contacts.

17. A combination according to claim 1, wherein said bimetal strip is fixed.

18. A combination according to claim 1, further including elongated support means accommodating said cylindrical body, and wherein said restricting means includes an elongated linear slot formed in said support means along an axis of elongation thereof.

* * * * *